July 12, 1955 — L. CALCAGNO — 2,712,672

PROCESS FOR PREPARING PROTEIC SPONGES

Filed Jan. 28, 1952

INVENTOR:
LUIGI CALCAGNO
BY:

2,712,672

PROCESS FOR PREPARING PROTEIC SPONGES

Luigi Calcagno, Milan, Italy

Application January 28, 1952, Serial No. 268,630

7 Claims. (Cl. 18—48)

This invention relates to a process for the manufacture of proteic sponges. It is one of the main features of this process to allow treatment of the proteic sponge with chemicals or medicaments during the manufacturing process.

This application is a continuation-in-part of my co-pending application Serial No. 178,168 filed August 7, 1950 now abandoned, and entitled "Employment of Denatured Protein Materials, in Their Solid State, as Vehicles for Medicaments or the Like, so as to Permit Tolerance and Slow Absorption of the Various Active Principles and the Resulting Product."

The present invention has as its objects:

(1) A process for the manufacture of proteic sponges which does not require hardening agents in order to preserve the spongy condition of the proteic mass during the various production steps.

(2) A process for the manufacture of proteic sponges in which hardening agents or denaturing chemicals are used only in cases where the finished product is required to have specific chemical, physico-chemical, or biological-chemical properties (as for example low hygroscopicity, a variation of enzymatic digestion time or the like).

Said hardening agents or denaturing chemicals are applied as hereinafter stated, by imbibition thereof while the sponge is being manufactured. The process of imbibition forms an integral part of this invention.

(3) A process for the manufacture of proteic sponges which contains drugs, or other substances, evenly distributed in the mass of the proteic texture of the finished dry product. This is achieved by suitable imbibition methods, during the manufacturing process above all when especially in cases where the various chemicals or medicaments cannot be added to the proteic substances at the beginning of the manufacturing process.

The imbibition method forms part of this invention since it makes possible the addition of various chemicals or medicaments which, due to their characteristics, cannot be added to proteic solutions at the start of the manufacturing process.

The process of preparing proteic sponges according to the present invention, consists essentially of the hereinafter stated steps:

(1) Freezing of an aqueous protein solution which has been previously converted into a gel or foam.

(2) Use of a supporting structure, embedded in the frozen proteic mass, for maintaining the spongy texture of the proteic mass and to keep its initial volume unchanged during the different processing steps.

(3) Dehydration of the frozen proteic mass by means of organic liquids.

(4) Imbibition of the proteic sponge obtained by the process steps (1) to (3) above, with solutions of various chemicals, for the purpose of hardening or denaturing, or for the addition of medicaments or for similar purposes. This may be done either during or after dehydration.

(5) Drying of sponge at low temperature and/or under vacuum.

(6) Removal of the supporting structure from the finished and dried sponge, cutting, packing and utilization, in general, of the thus prepared proteic sponge.

When a gelatine solution (5–10 per cent by weight) is poured into a container previously fitted with a suitable, movable supporting structure, such a solution, after cooling to room temperature, will become solidified (due to formation of a gel) and firmly anchored to said supporting structure. The supporting structure thus will be embedded in the outer parts of a solidified gelatine block.

Thereafter, when the whole is frozen at a temperature lower than 0° C., the gelatine block will become hardened in such a manner as to cause its dispersing and dispersed phases to stay evenly distributed.

Then, when the hardened (frozen) block (always with the supporting structure embedded therein) is removed from its container and dipped into a bath containing 10 parts by volume of ethyl alcohol or another suitable organic liquid (acetone or the like) a nearly complete dehydration of the frozen gelatine block can be attained. In this case the proteic mass will appear as a spongy block with porous lamellar fibres distributed in a rather uniform manner, and having a volume equal to that of the original frozen block. This is achieved to the supporting structure which has been initially embedded within the gelatine block.

By drying the spongy matter after permitting excess liquid to drip off, a dry spongy mass is obtained the fibres of which have lost, at least partly, their porosity in an irreversible manner, due to a partial glueing of adjacent fibres to each other. The decrease in porosity is shown by the fact that by repeated imbibition of the dry, proteic spongy mass with ethyl alcohol (or whatever other organic liquid has been used for the dehydration), the spongy mass will absorb less of said liquid than it was able to absorb prior to the drying operation. This behaviour is highly important in the manufacture of proteic sponges imbibed with medical substances, and can be considered as another of the main features of this invention. A further advantage especially when ethyl alcohol is used in the dehydration step, is in the high degree of purification of the proteic material. Particularly in the case of gelatine, the purification achieved is obviously much higher than the one resulting from employing the usual purification procedure, that is washing the granulated gelatine in ethyl alcohol. It will be appreciated that such a procedure for the purification of gelatine or other proteic materials, can be carried out also on proteic substances designed for other than medical-surgical purposes. For example, when a spongy condition of the finished material is not required, the purified spongy mass may be dissolved in water to obtain a pure proteic solution which can be further processed for many different purposes (as f.i. the production of protographic gelatines or the like). To obtain a very fine and completely homogeneous spongy texture, and also to utilize in the best possible manner all advantages of the process of the present invention, a proteic foam, obtained by heating the proteic solution before it has been completely cooled, can be substituted to great advantage for the normal proteic solution.

Thus, the invention consists, essentially in:

(1) The preparation of an aqueous proteic solution (from 0.1% by weight upwards).

(2) When a product of homogeneous, fine, spongy texture is required, the solution, for example a gelatine solution, first cooled to about 40° C., and then strongly beaten in a suitable container, until a foam with a volume, of preferably about three times that of the initial solution is obtained, and also until the temperature has gradually dropped to about 15° C. Thereafter the foam is quickly cooled to 0° C. without discontinuing the beating action, and then poured into previously cooled molds.

The molds filled with gelatine foam are put into a refrigerator, wherein the whole must be frozen within the shortest possible time.

If complete homogeneity is not required, the gelatine solution may be directly poured into the molds (without beating) and slowly cooled down to gel formation temperature, whereupon it is quickly frozen in the same molds.

(3) The molds used for the above purpose consists of:

(a) A tank with a supporting structure fitted into it, holding the liquid or foamy proteic mass at the start of operations, allowing the hereinafter described supporting structure to be embedded in the outer parts of the proteic mass while the latter is being solidified.

(b) A fabric lining, to withdraw more easily the proteic block after it has been frozen. This lining while not absolutely necessary, is used to great advantage.

(c) A rigid structure, consisting of elements articulated to one another which, embedded within the frozen proteic mass, serves as supporting and anchoring structure for the proteic block during the steps of dehydration and possibly imbibition with organic solvents, and also in the drying step.

This rigid supporting structure, is one of the essential features of the process of the present invention.

A useful cage-like structure is shown in the drawings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 2:
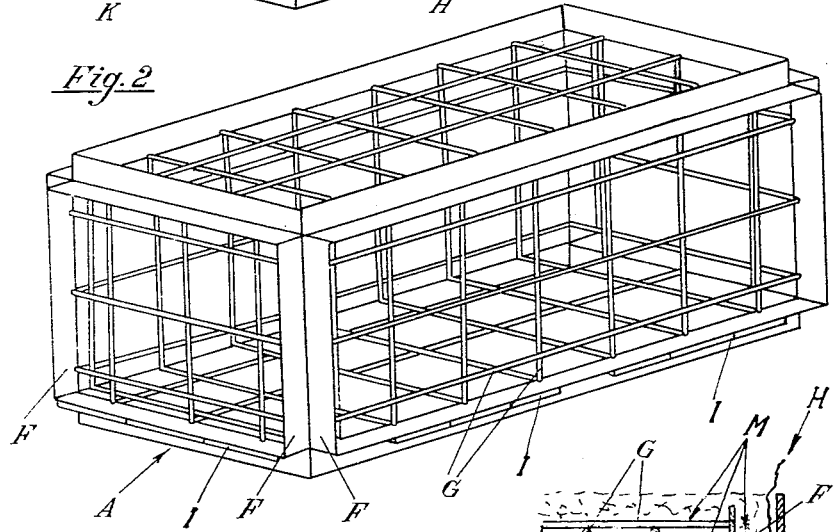
Fig. 2 is a perspective view of the inner frame-work of the structure of Fig. 1, in one position thereof.

Referring now to the drawings, the cage is formed by a parallelepipedous cage or basket A, with upper and side walls B and C, which respectively are at least in part, hinge connected with the bottom D. Each of said walls is formed (Figs. 2 and 3) by a frame F retaining interlaced wires G, so as to form a cage. The frames F cooperate with one another through contrasting surfaces which allow said cage walls to be drawn tightly together by the contraction of the sponge, without the cage losing its shape.

Figure 1:
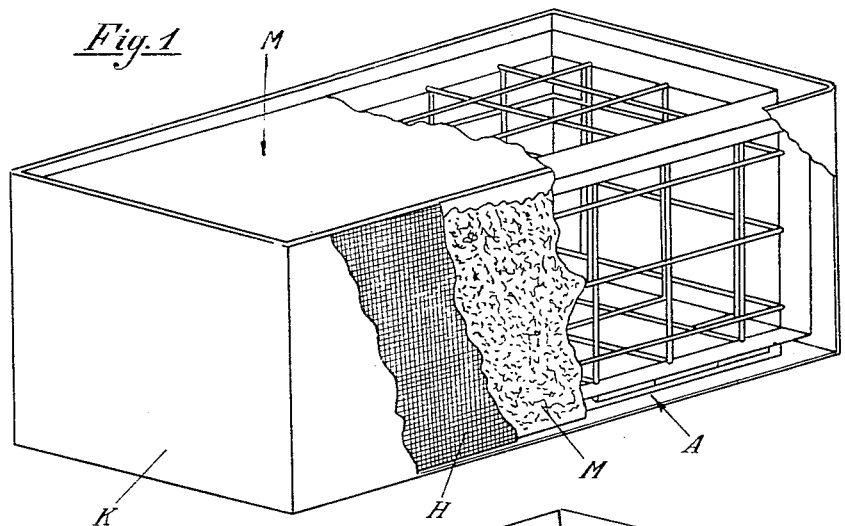
Fig. 1 is a perspective view of the entire structure with parts thereof being fragmentarily illustrated for the sake of clarity.

The cage or basket A is then covered on five of its sides, but not on its upper sides, with a tissue or linen H. This tissue or linen covering is for the purpose of easy removal of the entire cage from the basin into which the cage is put in order to bring the sponge in contact with the dehydrating agent. The entire cage is then placed in the basin or reservoir K as shown in Figs. 1 and 4.

Figures 3, 4:
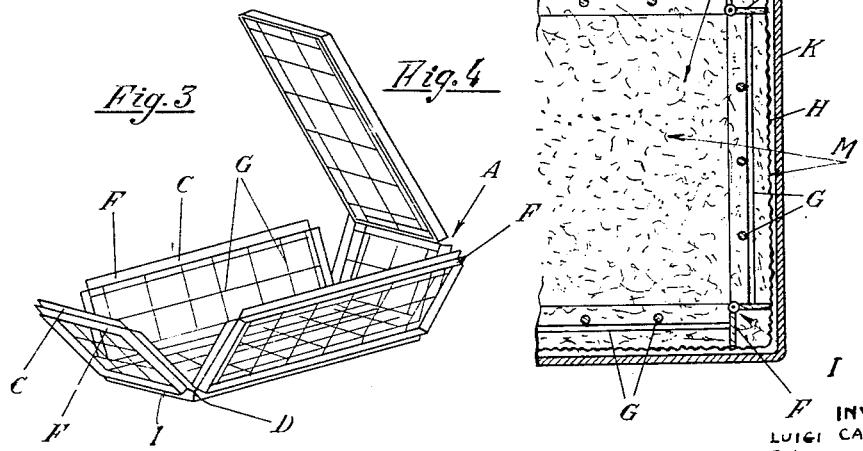
Fig. 3 is a diagrammatic view of the structure of Fig. 2 in another position thereof.
Fig. 4 is a fragmentary, partially sectional, plan view of the structure of Fig. 1.

The cage or basket sides are hingedly connected to one another and can be swung open in order to allow for the removal of the final solid block, as shown in Fig. 3.

As stated above the sides of the cage walls and the edges of their wall frames are so shaped as to embody contrasting surfaces in order to allow a strong adhesion of the gelatin foam to said walls and for preventing the sponge from having deformations and alterations of its characteristic structure in the successive steps of dehydration, imbibition and drying.

The linen covering H is useful as stated, for the removal of the entire block and cage, from the basin K, though the linen is not necessary. The basin K is useful for retaining in the cage-shaped mold the fluid foam before and during freezing.

It should be understood that the term "rigid structure" as used in this specification, is intended to include, besides the parallelepipedon cage as shown by way of example in the accompanying drawing, any other object, whatever its shape might be (spherical, polyhedric or the like), which may be utilized for the same purpose in the process of the present invention.

(4) After freezing of the proteic mass (gel or foam as the case may be) the proteic solid block is withdrawn from the tank, then the fabric lining is removed and the block dipped into a dehydrating bath. The bath of dehydrating liquid may consist of ethyl alcohol (95%), or of acetone or other organic liquids, pure or mixed, in accordance with requirements of the final product. The contents of the bath are also determined by the required imbibition with solutions of different chemicals, or finally by cost considerations.

Usually, a complete dehydration can be attained with a total of 10 parts by volume of anhydrous organic liquid.

In this way the frozen gel or proteic foam is converted into a solid sponge.

(5) If a water insoluble final product, hardened or denatured in any special manner is required, the proteic mass may be processed from the very start of the dehydration step, with a dehydrating liquid in which suitable amounts of insolubilizing, hardening or denaturing substances have been dissolved or mixed, for example 0.1% of formalin in ethyl alcohol. After the required insolubilizing, hardening or denaturing effect has been attained, the treatment must be repeated once or several times with fresh dehydrating liquid, in order to remove the possible excess of insolubilizing hardening or denaturing substances present in the sponge.

(6) When it is intended to obtain a final dry product showing a predetermined content of different chemical or biological substances in its proteic texture the proteic sponge, already dehydrated but yet imbibed with dehydrating liquid, is processed by dipping into further baths wherein the required substances have been previously dissolved. Should the medicament or the various chemicals to be embodied in the sponge, be insoluble in the dehydrating liquid, or show an incompatibility toward the dehydrating liquid, then the sponge is first washed in a pure solvent suitable for the medicament or chemicals to be embodied, following the same procedure as above described for the dehydration step. After such washing operation the sponge, imbibed with the washing liquid suitable for the medicament or the various chemicals as required, is dipped into another bath wherein the substance to be absorbed by the sponge is contained, and left therein until a concentration equilibrium with that substance has been attained.

(7) The proteic sponge, after having been dehydrated (as in point 4) or dehydrated, insolubilized or the like (as in point 5) or also dehydrated and treated with different chemicals (as in point 6) and wherein the rigid supporting structure is still embedded, is then dried under vacuum or in air. The drying conditions are essentially determined by the nature of the medicament or of the chemicals which have been embodied in the sponge, and also by the nature of the balance of imbibing liquid still contained therein.

(8) After the drying operation, the sponge edges which project outside of the framework of the rigid supporting structure, are cut off, and the structure exposed thereby; then the walls thereof are divaricated or removed, thus removing the sponge block from the rigid structure. Finally the sponge block is cut into the required sizes and shapes and suitably packed in accordance with the use for which it is intended.

By the above described process of the present invention, it becomes possible:

(1) To manufacture proteic sponges without the use of hardening agents such as formalin and the like, and/or plasticizers, such as for example lauryl alcohol or the like, the use of which has previously been required. According to the process of the present invention, formalin is used only when a non-hygroscopic final product is required, or in cases where it is required to graduate the duration of enzymatic digestion, and in the case of sponges designed for medical-surgical purposes when it is required to graduate the time required for absorption of the sponge by the tissues of the body. Thus, like in the case of formalin, any chemical possibly utilized in the manufacture of the sponge, is used only for the purpose of altering the chemical, chemico-physical or biochemical characteristics of the final product and not for the proper manufacturing of the sponge itself, since for this latter purpose the chemico-physical action of the dehydrating organic liquid, as above described, is sufficient.

(2) To produce extra-light proteic sponges, which could not be obtained by previously known methods. By starting for example with a 0.5% by weight gelatine solution, a sponge can be prepared in accordance with the present invention, having a weight of only 0.5 milligrams per cubic centimeter, or even less.

(3) To manufacture proteic sponges containing medical substances for medical-surgical purposes, even in cases where the medical substances are incompatible with the insolubilizing agents as formalin or the like. In such cases it must be kept in mind that the proteic constituent of the sponge shall exert the only function of a vehicle or carrier for the medicament, and as such it serves to improve the local tolerance for the medicament, and to control both its action and its absorption times.

(4) To manufacture—contrary to what has been possible with all other procedures heretofore known—proteic sponges wherein medicaments in a dry condition are contained which may easily be changed to the condition of the surrounding tissue and which are evenly distributed within the mass of the proteic texture of which the sponge is composed.

(5) To achieve a practically aseptic preparation of proteic sponges by the use of sterile materials in the different process steps as described in the present invention.

(6) To purify up to a grade higher than was previously possible the proteic constituent which is being processed.

The dehydrating organic liquids (or imbibition liquids for the different substances to be embodied) which are suitable for the present invention, are: ethyl alcohol, methyl alcohol, ethyl alcohol denatured, ethyl ether, chloroform, butyl and propyl alcohol, ethyl acetate, benzol, acetone and the like. However, amongst above substances, those which are most frequently utilized in the manufacturing of sponges designed for medical-surgical purposes, are: aceton and ethyl alcohol. It must, however, be understood that all organic liquids suitable for this invention are included in the term "dehydrating organic liquids" or "imbibition organic liquid" as used in the specification of the process of the present invention—notwithstanding the fact that only ethyl ether and aceton are cited in the examples.

Proteins obtained from the most different sources can be utilized in the manufacturing of sponges. In the specific case of sponges for medical-surgical purposes, the proteins suitable to be processed according to the present invention are: fibrin, animal gelatin or the like. Obviously, preference could be given to gelatine, due not only to its pharmacological and chemical-biological characteristics, but also to its lower cost, ready availability, advantageous characteristics of the finished product and the like. The foregoing notwithstanding, it must be stated that any kind of proteins or mixtures thereof can be processed in accordance with the present invention.

The following advantageous features are shown by the proteic sponges for medical-surgical purposes prepared in accordance with the present invention:

(1) They do not cause any appreciable antigen reaction, neither pyrogen nor from foreign substances.

(2) They are soft, non-friable, elastic, possess an even structure and are easy to cut in the required shapes and sizes.

(3) They can be easily imbibed with water, physiological solution, medicamentous solutions, blood, plasma and the like, all this without swelling over the original volume.

(4) Can be made soluble or insoluble in water.

(5) They can be applied even in dry condition; i. e. without being previously imbibed with physiological solution or the like.

(6) They can be absorbed by animal tissues within a very short period of time.

(7) Can contain in their mass, in dry condition, pharmacological active substances of different kind (chemiotherapeutic, biologic and the like) and exerting also a stabilizing action on these substances.

(8) They cause the absorbed medicaments to be well tolerated by the tissues.

(9) Extension of action of the absorbed medicaments over a considerable length of time, while the sponge, as carrier of the medicament, is gradually absorbed by the tissues.

(10) The absorption time by the tissues can be controlled at will, by varying the amount of formalin used in the preparing of the proteic sponge.

(11) Sponges for medical-surgical purposes made without treatment with formalin or other hardening agents can be easily prepared only by the process of the present invention.

Proteic sponges for medical or surgical purposes, prepared in accordance with the present invention, may be utilized for many different purposes such as:

(1) A local haemostatic in aseptic surgical treatments (primarily proteic sponges not treated either with medicaments or with formalin or other hardening or insolubilizing agents).

(2) A local haemostatic in septic surgical operation in the form of proteic sponges treated with antibiotics and/or bacteriostatic substances etc.

(3) Sponges suitably treated with medicaments can be used as topical medication for sores, wounds, fistulae, lacerated and contused wounds, in first aid infirmaries etc.

(4) Sponges treated with hormones can be used for inoculations.

The following examples are given as illustrative of preferred embodiments of the present inventions, the scope of said invention not however being limited hereto.

*Example I*

A warm 2% by weight solution of gelatin in water is prepared. This solution is whipped until a foam is produced having about three times the volume of the original solution. This foam is poured into a mold, as described and shown in the drawings, the cage having the dimensions of 10 x 10 x 25 cm. The mold containing the foam is then put in a cooler in order to freeze it, the cooler being at a temperature of about −20° C. After remaining in the cooler for about 12 hours the block of foam is removed from the basin by lifting via the linen bag and the linen bag separated from the cage.

The frozen block of foam which includes the supporting cage is then immersed in a dehydrating bath containing 1½ times the volume of the foam, said dehydrating bath being made up of ethyl alcohol. After 24 hours the liquid in the bath is replaced by fresh ethyl alcohol and this operation is repeated for five consecutive days. After this the excess of dehydrating liquid is allowed to dip off and the sponge is then allowed to dry under vacuum at 34° C. After drying the sponge is removed from the cage-shaped mold and cut into desired forms and shapes.

If desired this may then be dry sterilized. The thus obtained sponge is very hygroscopic and the packaging should be done in an air-conditioned room. The above example is illustrative of a proceess for preparing and purifying a soft, water-soluble gelatin sponge.

*Example II*

A block of frozen foam is prepared as described in Example I above, utilizing as a starting material an aqueous gelatin solution containing 0.5% by weight of gelatin. The block, with the cage-like mold enclosed, is immersed in a dehydration bath, containing 1½ times the volume of said block in ethyl alcohol to which has been added a 25% solution of formalin. The dehydrating liquid of the bath is replaced every 24 hours for two consecutive days by a fresh ethyl alcohol solution containing formalin. Then for three consecutive days the dehydrating liquid is replaced every 24 hours with pure ethyl alcohol. After dehydration, the excess dehydrating liquid is allowed to drip off and the sponge is dried and cut into desired shapes as in Example I above. The above example is illustrative of the process for preparing a very light insolubilized proteitic spongy material.

*Example III*

Blocks of gelatin sponge are prepared as in Example I or II above. After the excess dehydrating liquid has been allowed to drip from the block, the block is immersed in a solution of 1½ times of volume of said block. The solution contains 5% sulfonamide in ethyl alcohol. After 24 hours the imbibition solution is replaced by a fresh alcoholic sulfonamide solution. After another 24 hours the excess of imbibition solution is allowed to drip off, and drying and cutting into desired shapes is carried out as in Example I. The above example is illustrative of a process for preparing a medicated proteitic spongy material with imbibition after dehydration of sponge without or with hardening.

*Example IV*

A frozen proteitic block is prepared as in Example I or II. After being removed from the cooler the block is immersed in a dehydration bath containing 1½ times by volume of said block of ethyl alcohol into which has been dissolved 5% of a sulfonamide. Then dehydration takes place as described in examples above, the dehydration bath always containing however in addition to the ethyl alcohol, 5% of a sulfonamide. After the dehydration is completed, the imbibition liquid is allowed to drip off and drying and working are completed as in the above examples. This example is illustrative of a process for preparing a proteitic spongy material with a medicament imbided simultaneously with the dehydration of the sponge and without hardening.

*Example V*

A warm, 7% by weight gelatin solution is prepared. This solution is poured into a container containing a previously prepared aqueous sulfonamide suspension. The sulfonamide content of the solution is calculated depending upon the amount of the drug desired in final product. This solution is then whipped into a foam as in Example I and after having frozen the foam as in the preceding examples, the dehydration is carried out as in either Example I or II depending upon whether a hard or soft final product is desired. After dehydration the sponge is dried and cut into desired shapes and forms as in the preceding examples.

This example is illustrative of a process for the preparation of a medicated proteitic sponge into which the medicament is initially embodied along with the proteitic material.

*Example VI*

A gelatin sponge block is prepared as described in Example II by utilizing, as starting material, a sterile 4% gelatin solution. After dehydration has been completed with ethyl alcohol, containing a 15% formalin solution, the excess alcohol is allowed to drip off and the sponge block is placed in a bath containing 1½ times the volume of said block of acetone. After 24 hours, the acetone bath is replaced by a fresh acetone.

After another 24 hours the excess acetone is allowed to drip from the sponge block. This block is then placed into a procaine penicillin acetone solution. After 24 hours the penicillin solution is replaced by a fresh procain-penicillin-acetone solution. After another 24 hours the excess solution is allowed to drip off and the block is dried under vacuum. After drying the block is cut into desired shapes and forms. This process should always be carried out under aseptic working conditions. The above example is illustrative of a process for preparing a proteitic spongy material having penicillin imbibed therein, and using a different imbibition liquid than dehydration liquid.

*Example VII*

A warm 5% gelatin solution is prepared. This solution is poured into a mold and cooled to about 10° C. and the solution is transformed into a gel. The mold containing the gel is then placed at −22° C. in a cooler. After 24 hours the frozen block including the cage, is taken out of the cooler and of the mold and is immersed in a dehydration bath at 5° C. containing 1½ times the volume of the spongy block of ethyl alcohol. After 24 hours the hydrated alcohol is slowly drained from the bottom of the bath and replaced, from the top, little by little and continuously with fresh 95% alcohol.

This is carried on for three days during which 9 times the volume of said spongy block to ethyl alcohol is used. After dehydration is completed the excess alcohol is allowed to drain from the block and the block dried as in the previous examples. The above example is illustrative of a process for preparing a proteitic spongy material without whipping the solution to a foam.

While the invention has been illustrated and described as embodied in a process for preparing proteitic sponges, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process of preparing proteic sponges, comprising the steps of locating a rigid liquid-permeable cage-like structure completely within an aqueous solution of at least one protein; freezing said aqueous solution of said protein while said rigid structure is still located therein so as to form a substantially solid frozen block of said aqueous solution of said protein adhering to said rigid structure; treating said substantially solid frozen block of said aqueous solution of said protein adhering to said rigid structure with a liquid organic dehydrating agent so as to dehydrate said frozen aqueous solution and simultaneously coagulate the protein of said aqueous solution, thereby forming a spongy mass which adheres to said rigid structure which prevents substantial contracting of said spongy mass, said liquid organic dehydrating agent forming with the water of said aqueous solution an aqueous-agent mixture; drying the thus formed protein spongy mass by removal of said aqueous-agent mixture, thereby forming a proteic sponge; and separating the thus formed proteic sponge from said rigid cage-like structure.

2. A process of preparing proteic sponges, comprising the steps of locating a rigid liquid-permeable cage-like structure completely within an aqueous solution of at least one protein; freezing said aqueous solution of said protein while said rigid structure is still located therein so as to form a substantially solid frozen block of said aqueous solution of said protein adhering to said rigid structure; treating said substantially solid frozen block of said aqueous solution of said protein adhering to said rigid structure with a liquid organic dehydrating agent so as to dehydrate said frozen aqueous solution and simultaneously coagulate the protein of said aqueous solution, thereby forming a spongy mass which adheres to said rigid structure which prevents substantial contracting of said spongy mass, said liquid organic dehydrating agent forming with the water of said aqueous solution an aqueous-agent mixture; drying the thus formed protein spongy mass at a low temperature by removal of said aqueous-agent mixture, thereby forming a proteic sponge; and separating the thus formed proteic sponge from said rigid cage-like structure.

3. A process of preparing proteic sponges, comprising the steps of locating a rigid liquid-permeable cage-like structure completely within an aqueous solution of at least one protein; freezing said aqueous solution of said protein while said rigid structure is still located therein so as to form a substantially solid frozen block of said aqueous solution of said protein adhering to said rigid structure; treating said substantially solid frozen block of said aqueous solution of said protein adhering to said rigid structure with a liquid organic dehydrating agent so as to dehydrate and purify said frozen aqueous solution and simultaneously coagulate the protein of said aqueous solution thereby forming a spongy mass which adheres to said rigid structure which prevents substantial contracting of said spongy mass, said liquid organic dehydrating agent forming with the water of said aqueous solution an aqueous-agent mixture; drying the thus formed protein spongy mass at a low temperature under partial vacuum by removal of said aqueous-agent mixture, thereby forming a proteic sponge; and separating the thus formed proteic sponge from said rigid cage-like structure.

4. A process of preparing proteic sponges, comprising the steps of locating a rigid liquid-permeable cage-like structure completely within an aqueous solution of at least one protein; freezing said aqueous solution of said protein while said rigid structure is still located therein so as to form a substantially solid frozen block of said aqueous solution of said protein adhering to said rigid structure; treating said substantially solid frozen block of said aqueous solution of said protein adhering to said rigid structure with a liquid organic dehydrating agent so as to dehydrate said frozen aqueous solution and simultaneously coagulate the protein of said aqueous solution, thereby forming a spongy mass which adheres to said rigid structure which prevents substantial contracting of said spongy mass, said liquid organic dehydrating agent forming with the water of said aqueous solution an aqueous-agent mixture; treating the thus formed protein spongy mass with a solution of a medicament dissolved in a liquid organic dehydrating agent so as to cause imbibition of said solution of said medicament in said protein spongy mass; drying the thus formed protein spongy mass being imbibed with said medicament solution at a low pressure and under partial vacuum by removal of said aqueous-agent mixture and said liquid organic dehydrating agent of said medicament solution, thereby forming a proteic sponge containing a medicament; and separating said medicament containing proteic sponge from said rigid cage-like structure.

5. A process of preparing proteic sponges, comprising the steps of forming a foam of an aqueous solution of at least one portein; locating a rigid liquid-permeable cage-like structure completely within said foam of said aqueous solution; freezing said foam of said aqueous solution while said rigid structure is still located therein so as to form a substantially solid frozen block of said foam of said aqueous solution of said protein adhering to said rigid structure; treating said substantially solid frozen block of said foam of said aqueous solution of said protein adhering to said rigid structure with a liquid organic dehydrating agent so as to dehydrate said frozen foam of said aqueous solution and simultaneously coagulate the protein of said aqueous solution, thereby forming a spongy mass which adheres to said rigid structure which prevents substantial contracting of said spongy mass, said liquid organic dehydrating agent forming with the water of said aqueous solution an aqueous-agent mixture; drying the thus formed protein spongy mass by removal of said aqueous-agent mixture, thereby forming a proteic sponge; and separating the thus formed proteic sponge from said rigid cage-like structure.

6. A process of preparing proteic sponges, comprising the steps of forming a foam of an aqueous solution of at least one protein; locating a rigid liquid-permeable cage-like structure completely within said foam of said aqueous solution; freezing said foam of said aqueous solution while said rigid structure is still located therein so as to form a substantially solid frozen block of said foam of said aqueous solution of said protein adhering to said rigid structure; treating said substantially solid frozen block of said foam of said aqueous solution of said protein adhering to said rigid structure with a liquid organic dehydrating agent so as to dehydrate said frozen foam of said aqueous solution and simultaneously coagulate the protein of said aqueous solution, thereby forming a spongy mass which adheres to said rigid structure which prevents substantial contracting of said spongy mass, said liquid organic dehydrating agent forming with the water of said aqueous solution an aqueous-agent mixture; allowing at least a portion of said aqueous-agent mixture to drip from the thus formed protein spongy mass, thereby partially drying the same; completely drying said partially dried protein spongy mass by evaporation of the aqueous-agent mixture therefrom at a low temperature and under partial vacuum, thereby forming a proteic sponge; and separating the thus formed proteic sponge from said rigid cage-like structure.

7. A process of preparing proteic sponges, comprising the steps of forming a foam of an aqueous solution of at least one protein; locating a rigid liquid-permeable cage-like structure completely within said foam of said aqueous solution; freezing said foam of said aqueous solution while said rigid structure is still located therein so as to form a substantially solid frozen block of said foam of said aqueous solution of said protein adhering to said rigid structure; treating said substantially solid frozen block of said foam of said aqueous solution of said protein adhering to said rigid structure with a liquid organic dehydrating agent so as to dehydrate said frozen foam of said aqueous solution and simultaneously coagulate the protein of said aqueous solution, thereby forming a spongy mass which adheres to said rigid structure which prevents substantial contracting of said spongy mass, said liquid organic dehydrating agent forming with the water of said aqueous solution an aqueous-agent mixture; treating the thus formed protein spongy mass with a solution of a medicament dissolved in a liquid organic dehydrating agent so as to cause imbibition of said solution of said medicament in said protein spongy mass; drying the thus formed portein spongy mass being imbibed with said medicament solution by removal of said aqueous-agent mixture and said liquid organic dehydrating agent of said medicament solution, thereby forming a proteic sponge containing a medicament; and separating said medicament containing proteic sponge from said rigid cage-like structure.

References Cited in the file of this patent

UNITED STATES PATENTS

| Number | Name | Date |
|---|---|---|
| 1,960,120 | Mohring | May 22, 1934 |
| 2,000,042 | Sheppard | May 7, 1935 |
| 2,133,810 | Craigue | Oct. 18, 1938 |
| 2,167,215 | Leary | July 25, 1939 |
| 2,465,357 | Correll | Mar. 29, 1949 |
| 2,492,458 | Bering | Dec. 27, 1949 |
| 2,558,395 | Studer | June 26, 1951 |